United States Patent [19]

Taub et al.

[11] Patent Number: 4,942,798
[45] Date of Patent: Jul. 24, 1990

[54] APPARATUS FOR SHEAR-CUTTING A STACK OF AMORPHOUS STEEL SHEETS

[75] Inventors: Alan I. Taub; Minyoung Lee; Louis E. Hibbs, Jr., all of Schenectady, N.Y.

[73] Assignee: General Electric Company, King of Prussia, Pa.

[21] Appl. No.: 334,248

[22] Filed: Apr. 6, 1989

[51] Int. Cl.[5] .............................................. B26D 1/08
[52] U.S. Cl. ........................................ 83/636; 83/694
[58] Field of Search ........................ 83/694, 636, 693

[56] References Cited

U.S. PATENT DOCUMENTS

| | | | |
|---|---|---|---|
| 1,146,475 | 7/1915 | Carroll | 83/694 |
| 1,992,539 | 2/1935 | Munschauer | 83/694 |
| 4,738,173 | 4/1988 | Kiuchi | 83/34 |

Primary Examiner—Douglas D. Watts
Assistant Examiner—Rinaldi Rada
Attorney, Agent, or Firm—Henry J. Policinski; William Freedman

[57] ABSTRACT

For shear-cutting a stack of thin sheets of amorphous steel along a cutting plane that extends transversely of the stack, we utilize apparatus that comprises two blades that are positioned at the start of a cutting operation on opposite sides of the stack. Each of the blades has a first surface for engaging one side of the stack and a second surface extending transversely of the first surface and generally parallel to said cutting plane and intersecting the first surface at a corner. The first surface of each blade is disposed at a predetermined rake angle with respect to a reference plane extending through a point on the corner of the blade and normal to said cutting plane. By making the sum of these rake angles of a negative value and beween 5 and 35 degrees, we are able to substantially improve the wear resistance of the blades and lengthen their working life.

8 Claims, 2 Drawing Sheets

APPARATUS FOR SHEAR-CUTTING A STACK OF AMORPHOUS STEEL SHEETS

This invention relates to apparatus for shearcutting a stack of thin sheets of amorphous steel.

BACKGROUND

Amorphous steels are extremely hard materials and have presented considerable problems in shear-cutting due to excessive blade wear. One approach to overcoming these problems has been to soften the amorphous steel by heating prior to cutting. Australian Pat. No. 567,987 discloses examples of this approach. Another technique that has been explored is to locally heat the strip and apply a tensile parting force, thereby eliminating the need for blades. U.S. Pat. No. 4,670,636 — Taub et al discloses examples of this technique. While certain of these techniques are feasible, they are relatively expensive and awkward to apply in view of their requirement for heating and other special procedures and equipment. She most practical and straightforward approach to solving the problem of blade wear is to provide an improved blade design having greater wear resistance.

OBJECTS

Accordingly, an object of our invention is to provide, for shear-cutting amorphous steel, apparatus that comprises two shear blades having a special design that materially improves their wear resistance and lengthens their working life.

SUMMARY

In carrying out our invention in one form, we provide apparatus for shear-cutting a stack of thin sheets of amorphous steel along a cutting plane that extends transversely of the stack. The apparatus comprises two blades, each having a first, or work-engaging, surface for engaging the stack at one of its sides and a second surface that extends transversely of the work-engaging surface and generally parallel to the cutting plane. In each blade, these two surfaces intersect at a corner. The blades are positioned at the start of a cutting operation so that these corners are positioned at opposite sides of the stack and also on opposite sides of the cutting plane in juxtaposition thereto. During a cutting operation one of the blades is moved so that its corner moves toward the corner of the other blade in a direction parallel to the cutting plane, thus causing the corners to shear-cut the stack along the cutting plane. The work-engaging surface of said one blade is disposed at a predetermined rake angle with respect to a reference plane extending through the corner of said one blade and normal to the cutting plane and to the direction of motion of this blade. The work-engaging surface of the other blade is also disposed at a predetermined rake angle with respect to a corresponding reference plane extending through its corner. The sum of these rake angles is a negative value of between 5 degrees and 35 degrees.

BRIEF DESCRIPTION OF DRAWINGS

For a better understanding of the invention, reference may be had to the following detailed description taken in connection with the accompanying drawings, wherein:

FIG. 1 is taken along the line 1—1 of FIG. 2.

DETAILED DESCRIPTION OF EMBODIMENTS

Figure 1:
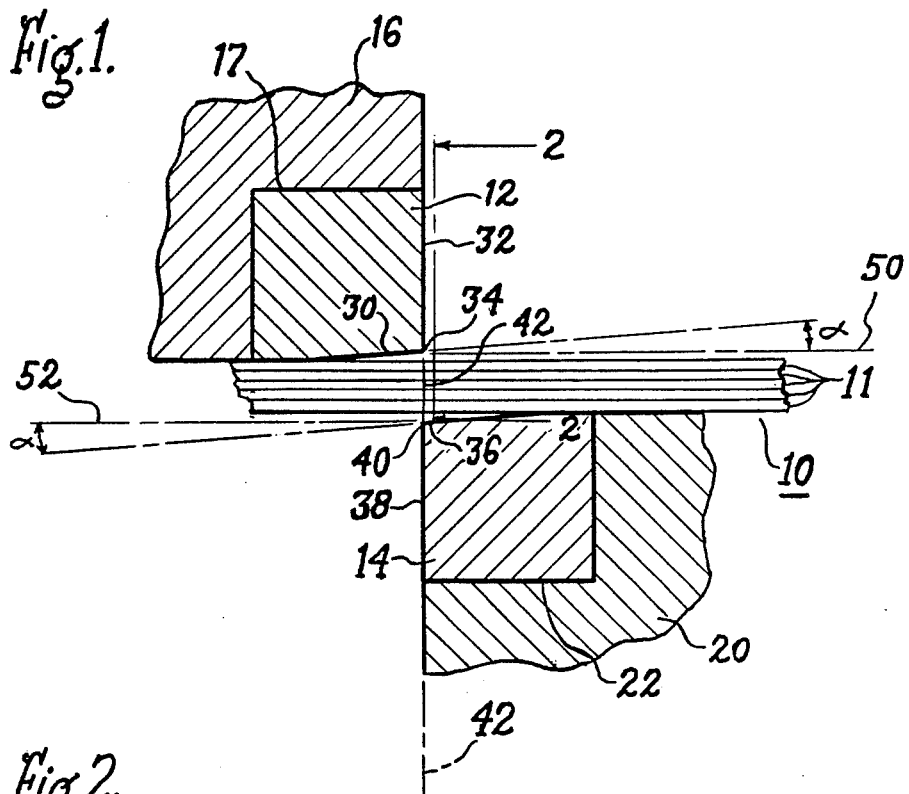
FIG. 1 is a cross-sectional view through the blades of cutting apparatus used for shear-cutting a stack of amorphous steel sheets.

Referring now to FIG. 1, there is shown a stack 10 of amorphous steel sheets 11 that is to be shear-cut by apparatus comprising two blades 12 and 14. Each of the blades is of a conventional hard cutting material, such as cemented tungsten carbide. The upper blade 12 is carried by a steel block 16 that contains a notch 17 in which the blade 12 is fitted and suitably brazed or otherwise attached to the block. The lower blade 14 is carried by a similar steel block 20 that contains a notch 22 in which the blade 14 is fitted and suitably brazed or otherwise attached. In the illustrated embodiment, the lower block 20 is stationary and the upper block 16 is vertically movable, but the invention in its broader aspects is not so limited, e.g., both blocks could be movable, or the lower block instead of the upper one could be movable.

The upper blade 12 has two surfaces 30 and 32 which are disposed transversely of each other and intersect at a corner 34. The lower blade 14 likewise has two surfaces 36 and 38 which are disposed transversely of each other and intersect at a corner 40.

Cutting of the stack 10 is effected along a vertically-extending cutting plane 42 that extends transversely of the stack 10. The corners 34 and 40 of the blades are located on opposite sides of this plane 42 and in juxtaposition thereto. The blade surfaces 32 and 38 extend parallel to this cutting plane 42 and are also located on opposite sides of the cutting plane and in juxtaposition thereto. Blade surfaces 32 and 38 are located as close to the cutting plane 42 as reasonably possible.

At the start of a cutting operation, the blades 12 and 14 are located at opposite sides of the stack 10, as shown in FIG. 1. The blades are so positioned by suitable conventional positioning and actuating means 45, shown in block form in FIG. 3, coupled to the upper block 16. Cutting is effected by moving the upper blade downwardly so that the corner 34 moves downwardly toward corner 40 in a direction parallel to the cutting plane. Such movement first moves the stack downwardly into engagement with surface 36 of the lower blade and then bends the stack 10 slightly downward until the upper surface of the stack is engaged by the lower surface 30 of the upper blade; and then the upper corner 34 moves downwardly through the stack and past the lower corner 40, shear-cutting the stack along the cutting plane 42 in the course of such downward motion. This downward motion of the blade is effected by operating the actuating means 45.

The work-engaging surface 30 of the upper blade is disposed at a negative rake angle $\alpha$ with respect to a reference plane 50 that extends through a point on its corner 34 and is normal to the cutting plane 42 and also normal to the direction of movement of the upper blade 12. In the illustrated embodiment, this reference plane 50 is a horizontal plane.

Similarly, the work-engaging surface 36 of the lower blade 14 is disposed at a negative rake angle α with respect to a reference plane 52 that extends through a point on its corner 40 and is normal to the cutting plane 42 and also to the direction of movement of the upper blade 12. In the illustrated embodiment, this reference plane 52 is also a horizontal plane.

The rake angle in a shear-cutting blade is considered to be negative if the work-engaging surface (e.g. 30) is so inclined as to make the corner (34) at the working edge of the blade less sharp than it would be if the work-engaging surface were located in the above-described reference plane (50).

In one embodiment of the invention, a negative rake angle of 15 degrees is used on each of the blades 12 and 14. Additional discussion of the rake angle appears hereinafter.

Figure 2:
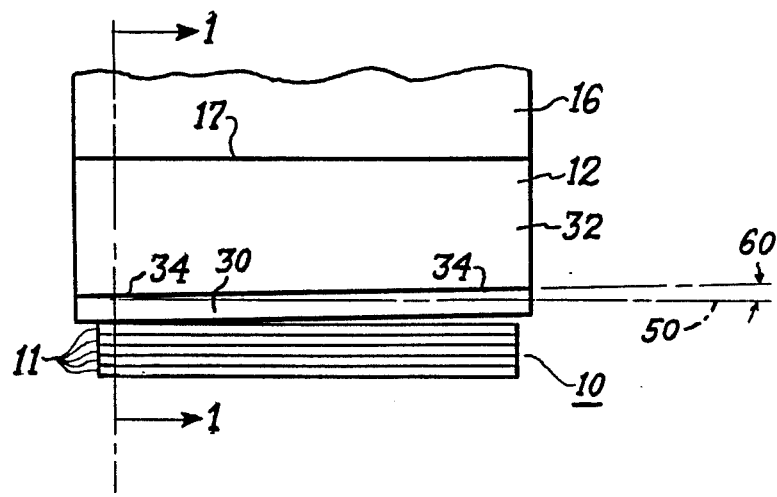
FIG. 2 is a side elevational view of one of the blades of FIG. 1 taken along the line 2—2 of FIG. 1.

In the embodiment of FIGS. 1 and 2, the upper blade 12 is also provided with a shear angle, which in the illustrated form of the invention is about two degrees. This shear angle is illustrated in FIG. 2 by the angle 60. The shear angle is the angle, as viewed in cutting plane 42, that the corner of the blade makes with references plane 50. By making this shear angle substantially greater than zero, the corner 34 of the blade can be made to enter the work more gradually along the length of the blade. In the illustrated embodiment, the lower blade has a zero degree shear angle, or, in effect, no shear angle.

Figure 3:
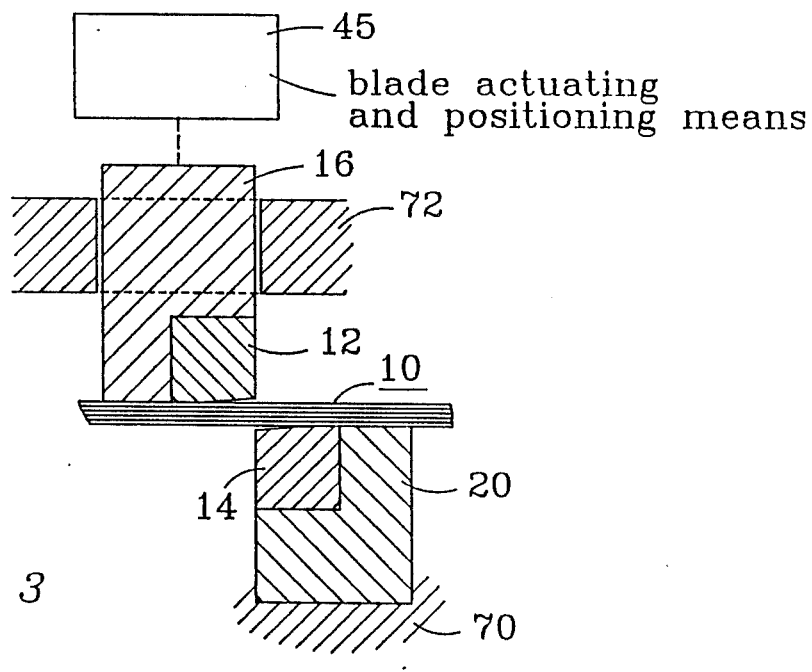
FIG. 3 is a schematic diagram of the cutting apparatus including the blades of FIG. 1.

It is important that the clearance between the surfaces 38 and 32 of the blades be kept as small as reasonably possible and maintained at a substantially fixed value during prolonged operation of the shear-cutting machine. To this end, the supporting framework for the blades and the blade supporting blocks 16 and 20 should be as stiff as feasible. This supporting framework is schematically illustrated in FIG. 3 at 70 and 72. Portion 70 holds the lower blade-supporting block 20 stationary, and portion 72 guides the upper block 16 for vertical movement.

Providing the blades 12 and 14 with a negative rake angle α, as above described, has provided dramatic increases in the life of the blades. This will be apparent from the results of the following tests, all performed on substantially identical stacks of amorphous steel strips, each stack containing 10 strips of Allied-Signal Corporation's Metglas 2605-S2 amorphous steel, each strip being about 3.3 inches wide and about 0.001 inch thick. The stacks were formed by effectively-continuous lengths of strip, superposed and aligned, as illustrated in FIGS. 1 and 2. The superposed, aligned strips were shear-cut along the plane 42 of FIG. 1, following which the superposed strips were advanced a predetermined distance along their length and again cut along a corresponding plane 42. Such operations were repeated over and over again until the cut quality as determined by inspection became unacceptable, thus indicating a blade failure. Each cut was performed by one downward stroke of the upper blade through the entire stack thickness, following which the blade was returned to its position of FIG. 1 in preparation for a new cutting operation.

In one series of tests, blades 12 and 14 corresponding to those illustrated and disclosed hereinabove, each having a negative rake angle of 15 degrees, were used for the cutting operations. Sixty-thousand (60,000) cuts were made with these blades before a blade failure occurred.

In another series of tests made with the same shear-cutting machine except using standard blades (i.e., blades otherwise identical to the illustrated blades except having zero degree rake angles), only 10,000 cuts were made before a blade failure occurred.

In the two series of tests, the blades were of the same material (i.e., the top blade was of Carballoy Grade 895 very fine grain cemented tungsten carbide containing 6 percent cobalt, and the bottom blade was of Carballoy Grade 883 cemented tungsten carbide containing 6 percent cobalt), and a shear angle (60) of 2 degrees was present on the top blade. (In the standard, or zero—degree rake angle, blades referred to hereinabove, the surfaces 30 and 32 of the upper blade intersected at a right angle corner, and the surfaces 36 and 38 of the lower blade intersected at a right angle corner.)

In view of the above test results, it will be apparent that a very significant increase in blade life can be obtained by using a negative rake angle on the shear blades used for cutting these stacks of amorphous steel strips.

Figure 4:
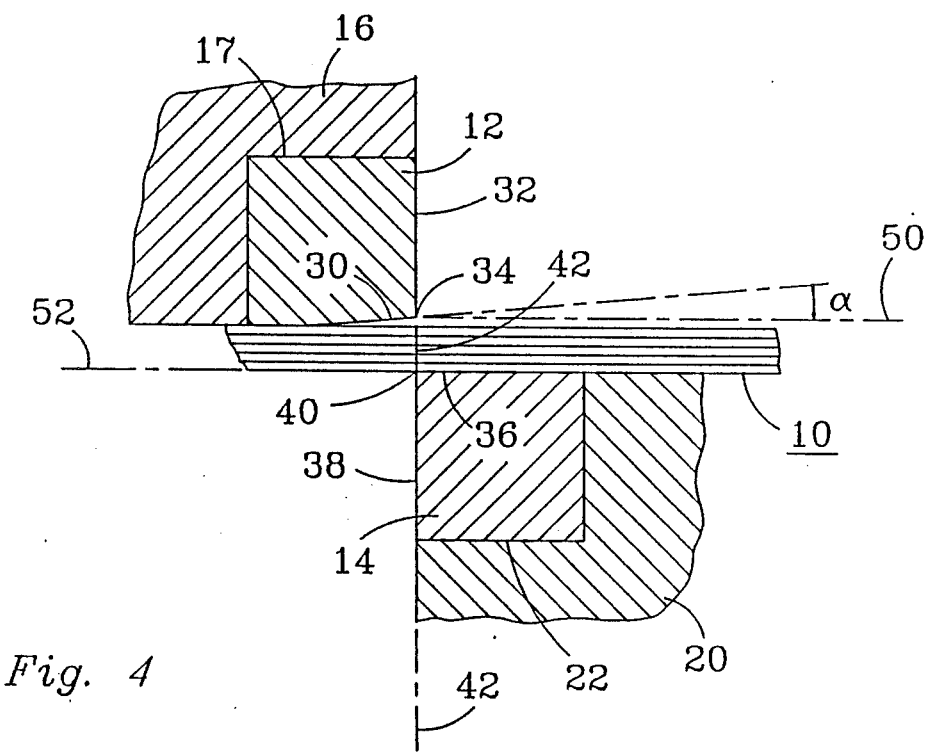
FIG. 4 is a cross-sectional view similar to that of FIG. 1 except showing a modified form of the lower blade.

Although we provide in one embodiment of our invention a negative rake angle on both blades, our invention in its broader aspects comprehends shear-cutting apparatus in which only a single blade is provided with the negative rake angle. In this latter arrangement, illustrated in FIG. 4, the other blade is of a standard configuration, i.e., with a zero degree rake angle.

Our tests indicate that in order for significant improvements in wear life of the blades to be derived from the use of negative rake angles in this shear-cutting application, the sum of the rake angles present on the two blades should be a negative value of at least 5 degrees. The higher the total negative rake angle, the greater is the side thrust developed on the blades tending to separate them during a cutting operation. Unless this separation is limited to a very small value, the quality of the cut is materially impaired. Our studies of this effect indicate that the maximum total negative rake angle should be about 35 degrees.

Our studies of blade-life improvement versus separating forces on the blades indicate that the preferred rake angle for the blades is a negative rake angle of between 8 and 15 degrees for each blade.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. Apparatus for shear-cutting a stack of thin amorphous steel sheets along a cutting plane that extends transversely of said stack, comprising:
   (a) first and second blades each having a first surface for engaging said stack at one side thereof and a second surface that extends transversely of said first surface and generally parallel to said cutting plane, the first and second surfaces of each blade intersecting at a corner,
   (b) means for positioning said blades at the start of a cutting operation so that said corners are positioned at opposite sides of said stack and also on opposite sides of said cutting plane in juxtaposition thereto, and
   (c) means for moving one of said blades during a cutting operation so that the corner thereof moves toward the corner of the other blade in a direction parallel to said cutting plane, thereby causing the corners of said blades to shear-cut the stack along said cutting plane, and further characterized by:

(d) said first surface of said one blade being disposed at predetermined rake angle with respect to a reference plane extending through a point on the corner of said one blade and normal to said cutting plane and to the direction of motion of said one blade, (e) said first surface of said other blade being disposed at predetermined rake angle with respect to a reference plane extending through a point on the corner of said other blade and normal to said cutting plane and to the direction of motion of said one blade, and (f) the sum of said rake angles being a negative value of between 5 degrees and 35 degrees, and in which: the rake angle of either of said blades is considered to be negative if said first surface of the blade, in intersecting said second surface thereof at said corner of the blade, is so inclined as to make the corner less sharp than it would be if said first surface were located in said reference plane.

2. The apparatus of claim 1 in which one of said blades has a substantially zero degree rake angle.

3. The apparatus of claim 2 in which:
(a) said cutting plane is vertically disposed, and
(b) said reference planes are horizontally disposed.

4. The apparatus of claim 1 in which each of said blades has a negative rake angle of between 8 and 15 degrees.

5. The apparatus of claim 4 in which:
(a) said cutting plane is vertically disposed, and
(b) said reference planes are horizontally disposed.

6. The apparatus of claim 1 in which each of said blades is of cemented tungsten carbide.

7. The apparatus of claim 1 in which:
(a) said cutting plane is vertically disposed, and
(b) said reference planes are horizontally disposed.

8. The apparatus of claim 1 in which, as viewed from said cutting plane, one of said blades has a shear angle of several degrees as measured between the corner of said one blade and said reference plane of said one blade.

* * * * *